(12) United States Patent
Choi et al.

(10) Patent No.: US 11,616,234 B2
(45) Date of Patent: Mar. 28, 2023

(54) NEGATIVE ELECTRODE FOR RAPIDLY RECHARGEABLE LITHIUM SECONDARY BATTERY AND MANUFACTURING METHOD THEREOF

(71) Applicant: KOREA ELECTROTECHNOLOGY RESEARCH INSTITUTE, Changwon (KR)

(72) Inventors: Jeong Hee Choi, Busan (KR); Sang Min Lee, Changwon (KR); Min Ho Lee, Changwon (KR); Cheol Ho Lee, Geoje (KR); Jong Wook Bae, Busan (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 358 days.

(21) Appl. No.: 16/760,778

(22) PCT Filed: Nov. 2, 2018

(86) PCT No.: PCT/KR2018/013253
§ 371 (c)(1),
(2) Date: Apr. 30, 2020

(87) PCT Pub. No.: WO2019/088758
PCT Pub. Date: May 9, 2019

(65) Prior Publication Data
US 2020/0328422 A1  Oct. 15, 2020

(30) Foreign Application Priority Data
Nov. 2, 2017 (KR) .......................... 10-2017-0145554
Oct. 30, 2018 (KR) .......................... 10-2018-0131263

(51) Int. Cl.
*H01M 4/62* (2006.01)
*H01M 4/04* (2006.01)
(Continued)

(52) U.S. Cl.
CPC ............ *H01M 4/62* (2013.01); *H01M 4/0423* (2013.01); *H01M 4/139* (2013.01); *H01M 10/0525* (2013.01); *H01M 2004/027* (2013.01)

(58) Field of Classification Search
None
See application file for complete search history.

(56) References Cited

U.S. PATENT DOCUMENTS 9,899,682 B2    2/2018 Uhm et al.
2008/0241684 A1  10/2008 Muraoka et al.
(Continued)

FOREIGN PATENT DOCUMENTS

JP    2005183179 A  *  7/2005
JP    2008243708 A     10/2008
(Continued)

*Primary Examiner* — Basia A Ridley
*Assistant Examiner* — Heng M. Chan

(57) ABSTRACT

Disclosed is a rapidly rechargeable lithium secondary battery. The present invention provides a negative electrode for a lithium secondary battery, the negative electrode being characterized by including: a current collector; a negative electrode material layer which is formed on the current collector and includes negative electrode active material particles, conductive material particles, and a binder; and a surface layer which is formed on the surface of the negative electrode material layer, is formed of insulating particles that are inert with respect to lithium, and partially shields the negative electrode material layer. According to the present invention, a negative electrode for a lithium secondary battery having a high charging speed without lifetime degradation can be provided.

8 Claims, 9 Drawing Sheets

(51) Int. Cl.
*H01M 4/139* (2010.01)
*H01M 10/0525* (2010.01)
*H01M 4/02* (2006.01)

(56) References Cited

U.S. PATENT DOCUMENTS

2011/0151322 A1   6/2011   Joo et al.
2013/0071741 A1   3/2013   Ohara et al.
2015/0024249 A1   1/2015   Lim et al.
2015/0380708 A1*  12/2015  Yamada .............. H01M 50/449
                                                    429/144

FOREIGN PATENT DOCUMENTS

| | | | |
|---|---|---|---|
| JP | 2010192365 A | * | 9/2010 |
| JP | 2010192365 A | | 9/2010 |
| JP | 2012015099 A | | 1/2012 |
| KR | 20110071699 A | | 6/2011 |
| KR | 20140014692 A | * | 2/2014 |
| KR | 20140014692 A | | 2/2014 |
| KR | 20150010159 A | | 1/2015 |
| KR | 101592993 B1 | | 2/2016 |
| KR | 20170019213 A | | 2/2017 |
| KR | 20170034110 A | | 3/2017 |

* cited by examiner

NEGATIVE ELECTRODE FOR RAPIDLY RECHARGEABLE LITHIUM SECONDARY BATTERY AND MANUFACTURING METHOD THEREOF

TECHNICAL FIELD

The present invention relates to a lithium secondary battery, and more particularly, to a rapidly rechargeable lithium secondary battery.

BACKGROUND ART

A lithium secondary battery is generally composed of a positive electrode, an electrolyte, and a negative electrode. A universally commercialized lithium secondary battery has a structure in which a polymer separation membrane having a thickness of 15 to 25 μm is added in a liquid electrolyte composed of an organic solvent and a lithium salt, so that $Li^+$ ions move from the negative electrode to the positive electrode and electrons generated by the ionization of Li also move from the negative electrode to the positive electrode during discharging, and the $Li^+$ ions and the electrons move in the opposite direction during charging. The driving force for the $Li^+$ ion movement is generated by chemical stability due to the potential difference between both electrodes. The capacity (Ah) of a battery is determined by the amount of $Li^+$ ions moving from the negative electrode to the positive electrode and from the positive electrode to the negative electrode.

The term charging speed is used in charging and discharging a battery, the charging speed is a relative concept about the battery capacity, and a charging speed of 1 C refers to a current for charging or discharging an electric charge amount corresponding to the capacity of a battery in one hour. A lithium ion battery usually has a charging speed of about 0.2 to 0.3 C, and it takes about 3 to 5 hours to fully charge the lithium ion battery.

In particular, a lithium secondary battery for an electric vehicle needs to increase the energy density in order to increase the mileage, but the long charging time associated with the increase in energy density is inconvenient, which acts as an obstacle to the expansion of the electric vehicle market.

A higher charging speed may be used for faster charging, but in this case, the lithium secondary battery for an electric vehicle shows good rapid charging characteristics when the electrode plate is thin or at a low loading level, but deterioration in an electrode, particularly the negative electrode occurs at a high loading level.

In the related art, there has been an attempt to enhance rapid charging characteristics by increasing the number of activation sites by surface treatment of graphite which is a negative electrode active material to increase ion conductivity or electrical conductivity, or an attempt to improve rapid charging characteristics by a method of introducing a porous structure into an active material or complexing the active material with a conductive material, and the like. However, such an approach induces deterioration in initial efficiency or a decrease in energy density per volume, or is effective for rapid charging, but does not show a significant effect for rapid discharging in many cases. Further, methods in the related art have a disadvantage in that high manufacturing cost is required because the manufacturing method is complicated.

Therefore, it is important to secure a technology for manufacturing a negative electrode capable of rapid charging while minimizing a decrease in energy density of the cell.

DISCLOSURE

Technical Problem

To solve the aforementioned problems in the related art, an object of the present invention is to provide a negative electrode for rapid charging and a lithium secondary battery including the same.

Further, an object of the present invention is to provide a negative electrode for rapid charging, which requires low manufacturing costs due to a simple manufacturing method and a lithium secondary battery including the same.

In addition, an object of the present invention is to provide a method for manufacturing the above-described negative electrode and a lithium secondary battery including the same.

Technical Solution

To achieve the technical problems, the present invention provides a negative electrode for a lithium secondary battery, the negative electrode being characterized by including: a current collector; a negative electrode material layer which is formed on the current collector and includes negative electrode active material particles, conductive material particles, and a binder; and a surface layer which is formed on the surface of the negative electrode material layer, is formed of insulating particles that are inert with respect to lithium, and partially shields the negative electrode material layer.

In the present invention, the surface layer may have an area occupied by the surface layer of less than 50%, more preferably less than 10% in the surface area of the negative electrode material.

In the present invention, the surface layer may include at least one selected from the group consisting of an insulating metal oxide, an insulating metal nitride, and an insulating metal oxynitride, and specifically, the surface layer may include at least one oxide selected from the group consisting of $Al_2O_3$, ZnO, CuO, BeO, $Be_2O$, $Be_2O_3$, $Be_6O$, $Na_2O$, MgO, $P_2O_5$, $K_2O$, CaO, MoO, $MoO_2$, $MoO_3$, NiO, $NiO_2$, CoO, $CoO_3$, $CoO_2$, $Cr_2O_3$, $Cr_3O_4$, NbO, $NbO_2$, $Nb_2O_5$, and $ZrO_2$.

In the present invention, the insulating particles of the surface layer may be concentrated in the vicinity of a neck formed by the contact of the negative electrode active material particles between negative electrode active material particles, or at the edges of the particles.

The surface layer preferably has a penetration depth from the surface of the negative electrode material of less than 1 to 10 micrometers.

To achieve the other technical problems, the present invention provides a method for manufacturing a negative electrode of a lithium secondary battery, the method including: applying a negative electrode material composed of a negative electrode active material, a conductive material, and a binder onto a current collector; and surface-treating the surface of the negative electrode material with insulating particles that are inert with respect to lithium.

In the present invention, the surface-treatment step may be performed by a vapor deposition method.

In contrast, the surface-treatment step may include: preparing a coating solution by dispersing insulating particles in a solvent; applying the coating solution onto the negative electrode material; and forming a surface layer by drying the applied coating solution. In this case, it is preferred that the solvent is glycerol and the concentration of the insulating particles of the coating solution is 2 to 8 wt %.

In the present invention, the drying step may be performed at 100 to 150° C.

Advantageous Effects

According to the present invention, a negative electrode for a lithium secondary battery having a high charging speed without lifetime degradation can be provided.

BEST MODE

Hereinafter, the present invention will be described in detail by explaining preferred exemplary embodiments of the present invention with reference to drawings.

Figure 1:
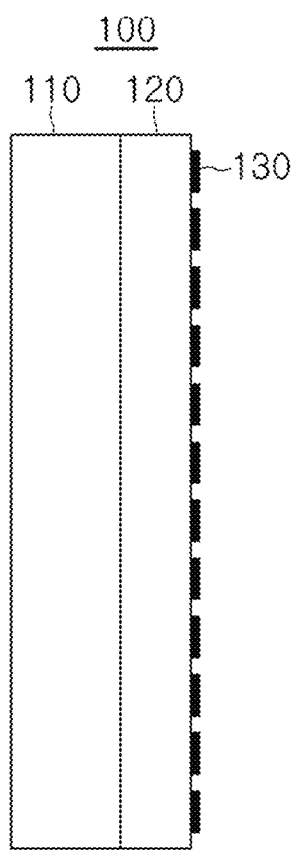
FIG. 1 is a view schematically explaining the structure of the negative electrode of the present invention.

FIG. 1 is a view schematically explaining the structure of the negative electrode of the present invention.

Referring to FIG. 1, a negative electrode (100) includes a current collector 110, a negative electrode material 120, and a surface layer 130. The negative electrode material includes negative electrode active material particles 122, conductive material particles 124, and a binder 126. A surface layer 130 that partially shields the negative electrode material 120 is formed on the surface of the negative electrode material 120. The surface layer 130 is a material layer having a very low concentration (#/cm$^2$). Specifically, when the surface area of the negative electrode material is 100%, the area occupied by the surface layer 130 in the surface of the negative electrode material may be less than about 50%, less than about 40%, less than about 30%, less than about 20%, less than about 10%, less than about 5%, and less than about 1%.

Figure 2:
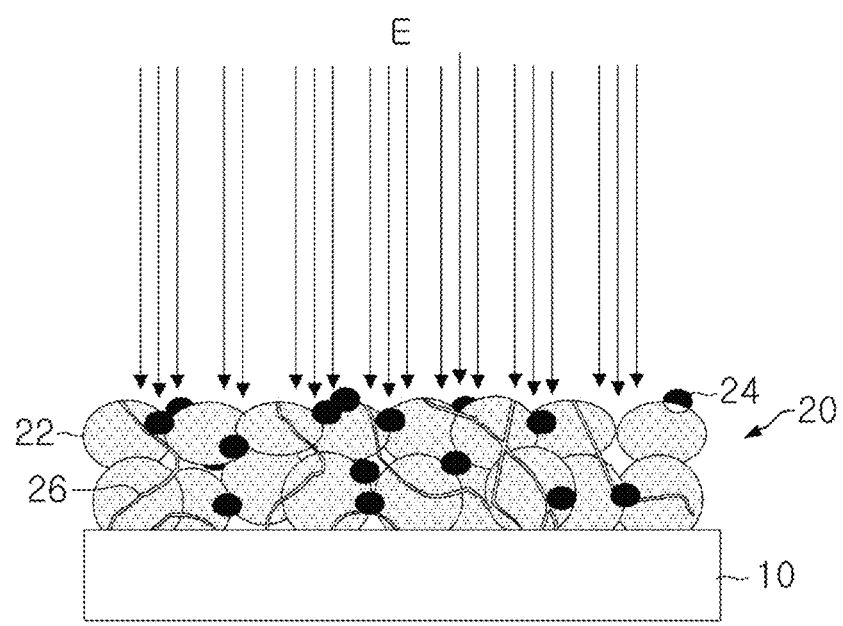
FIG. 2 is a view schematically illustrating the electric field distribution in the electrode during charging in the structure of a negative electrode in the related art.
Figure 3:
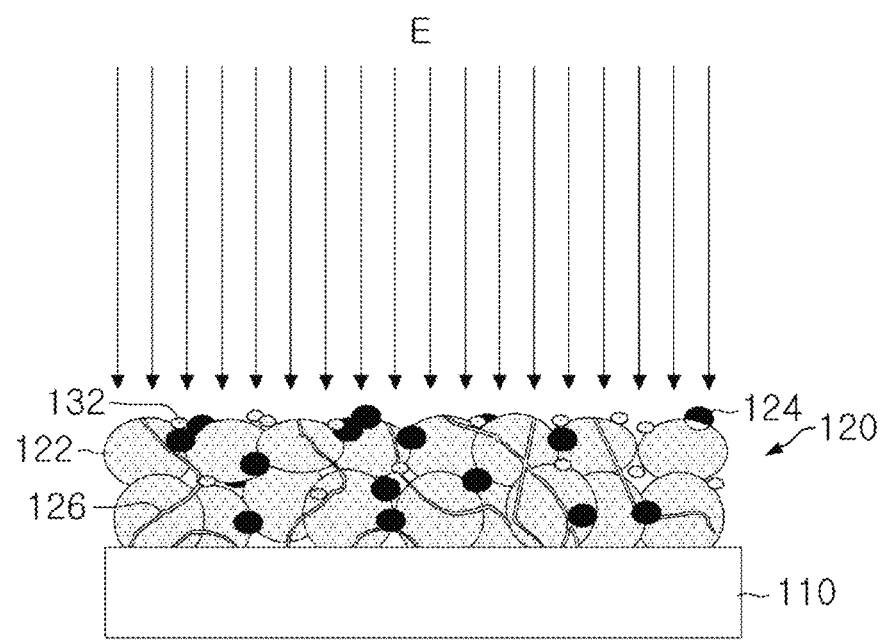
FIG. 3 is a view schematically illustrating the structure of the negative electrode according to an exemplary embodiment of the present invention for solving the problems of the negative electrode structure of FIG. 1.

FIGS. 2 and 3 are views for explaining the rapid charging mechanism of the negative electrode according to an exemplary embodiment of the present invention.

First, FIG. 2 is a view schematically illustrating the electric field distribution in the electrode during charging in the structure of a negative electrode in the related art.

Referring to FIG. 2, a negative electrode material 20 on a current collector 10 includes negative electrode active material particles 22, conductive material particles 24, and a binder 26.

As illustrated, the negative electrode material 20 is composed of active material particles 22, conductive material particles 24, and a binder 26, so that there may be non-uniformity of a surface structure and/or a composition locally. That is, there is a change in composition depending on the position on the surface of the negative electrode, the resistance becomes locally non-uniform, and accordingly, the electric field density applied to the surface of the negative electrode 20 may vary depending on the position. For example, a high electric field density may be applied to particularly a neck portion where active material particles are brought into contact with each other on the surface of the negative electrode. If a very high electric field density is locally applied during rapid charging and discharging, the corresponding portion rapidly deteriorates, leading to deterioration in cycle characteristics. Further, the negative electrode deteriorates due to the phenomenon in which the current density is relatively concentrated at the edge portions of the particles due to the edge effect in the surface of the electrode.

FIG. 3 is a view schematically illustrating the structure of the negative electrode according to an exemplary embodiment of the present invention for solving the problems of the negative electrode structure of FIG. 2.

Referring to FIG. 3, a negative electrode material 120 may include active material particles 122, conductive material particles 124, and a binder 126.

In the present invention, as the active material, it is possible to use a carbonaceous material, a lithium metal, silicon, tin, antimony, phosphorus, or an alloy of these metals. Further, as the carbonaceous material, it is possible to use at least one of materials composed of crystalline or amorphous carbon such as artificial graphite, natural graphite, graphitized carbon fiber, graphitized mesocarbon microbeads, petroleum coke, plastic resins, carbon fiber and pyrocarbon. In addition, as the active material, it is also possible to use an active material obtained by surface-treating the surface of the carbonaceous material particles with $Nb_2O_5$, $SiO_x$, metal phosphide (MePx), LTO, CNT, and the like.

Furthermore, the conductive material particles 124 may use carbon black, graphite, carbon fiber, carbon nanotube, a metal powder, a conductive metal oxide, an organic conductive material, and the like. Further, as the binder, it is possible to use various types of binder polymers such as a vinylidene fluoride-hexafluoropropylene copolymer, polyvinylidene fluoride, polyacrylonitrile, polymethylmethacrylate, styrene butadiene rubber (SBR), and carboxymethyl cellulose (CMC).

In the present invention, the function of the insulating surface layer 130 composed of the insulating particles 132 may be explained by the following mechanism. However, the mechanism to be described below is intended to understand the present invention and does not limit the technical idea of the present invention.

The insulating surface layer 130 composed of the insulating particles 132 may improve the localized distribution of the electric field density. The insulating particles 128 introduced in the present invention change the electric field density applied to the surface by electrically shielding the surface of the negative electrode material. As illustrated, the localized concentration of electric field density in FIG. 2 may be homogenized by the presence of insulating particles 128. For example, the insulating particles are present at a high frequency and density in the neck portion where the active material is in contact, and the electric field density concentrated in this portion may be reduced. Of course, another aspect, for example, unlike those described above, a mechanism for making the homogenized electric field density non-homogeneous may also act on the change in the electric field density.

Further, in the present invention, the insulating surface layer 130 physically screens the surface of the negative electrode material layer. Since the locally present insulating particles do not react with lithium, lithium intercalation in the corresponding surface region is limited, and physical contact between the negative electrode material and the electrolyte is also limited.

The above-described changes in the surface characteristics of the negative electrode material may be understood as a main cause for explaining the improvement in charging and discharging characteristics to be described below.

In the present invention, the insulating surface layer preferably has a penetration depth of 10 μm or less from the surface of the negative electrode material. When the penetration depth is more than 10 μm, the insulating effect of the particle layer may interfere with the current, resulting in deterioration in performance such as capacity and output. Furthermore, in the present invention, the insulating surface layer may be distributed intermittently over the surface of the negative electrode material, and may be concentrated at the edges of the active material particles and between the particles.

In the present invention, the insulating particles may be oxides of insulating metals such as, for example, $Al_2O_3$, $ZnO$, $CuO$, $BeO$, $Be_2O$, $Be_2O_3$, $Be_6O$, $Na_2O$, $MgO$, $P_2O_5$, $K_2O$, $CaO$, $MoO$, $MoO_2$, $MoO_3$, $NiO$, $NiO_2$, $CoO$, $CoO_3$, $CoO_2$, $Cr_2O_3$, $Cr_3O_4$, $NbO$, $NbO_2$, $Nb_2O_5$, and $ZrO_2$, nitrides of the metals, or oxynitrides of the metals. In the present invention, the surface of the negative electrode 120 is surface-treated with an insulating surface layer. In the present invention, the insulating particles 132 are composed of a material that is substantially inert with respect to lithium metal or lithium ions in the electrolyte in the charging and discharging situation. Therefore, the negative electrode active material of the lithium secondary battery is excluded from the insulating particles.

In the present invention, the insulating surface layer may be introduced by various methods. For example, coating of an insulating particle slurry or a vapor deposition method such as vapor deposition may be used. In the above-described methods, a small amount of insulating particles may be concentrated in a neck portion between active material particles, which is a relatively unstable site, or between adjacent active material particles.

In the case of the vapor deposition method, a technique capable of realizing a insulating particle layer having a very thin thickness, such as an atomic layer deposition method may be used.

MODE FOR INVENTION

Hereinafter, preferred exemplary embodiments of the present invention will be described.

Example 1

First, as a positive electrode, a positive electrode material was prepared by mixing $LiNi_{0.6}Mn_{0.2}Co_{0.2}O_2$ as a positive electrode active material, Super P as a conductive material, and PVDF as a binder at a weight ratio of 95:2.5:2.5. A positive electrode was prepared by applying the prepared positive electrode material onto an Al foil with L/L=16.4 mg/cm$^2$ and a mixture density of 3.0 g/cc based on a loading level of 3.0 mAh/cm$^2$.

Next, as a negative electrode, a negative electrode material was prepared by mixing graphite as a negative electrode active material and PVDF as a binder at a weight ratio of 96:4. The prepared negative electrode material was applied onto a Cu foil with L/L=11.1 mg/cm$^2$ and a mixture density of 1.5 g/cc. Subsequently, the surface of the prepared negative electrode material was surface-treated with alumina. The surface treatment method is as follows. First, a solution having a concentration of 4 wt % was prepared by dispersing an alumina powder having an average particle diameter of 50 nm or less in glycerol. After the prepared solution was stirred for 12 hours, a negative electrode was manufactured by applying the dispersed solution onto the surface of the negative electrode material, and then drying the surface at a temperature of 200° C.

As an electrolyte solution, a 1 M $LiPF_6$ electrolyte solution was prepared in a mixture containing EC/EMC/DEC at a volume ratio of 3:5:2.

A 2032 coin cell was manufactured by punching the manufactured positive electrode and negative electrode so as to have a diameter of 14 mm and 16 mm, respectively.

For comparison with Example 1, a 2032 coin cell was manufactured in the same manner as described above using a negative electrode that had not been surface-treated.

Example 2

A negative electrode was manufactured in the same manner as in Example 1, except that a negative electrode material having the surface of graphite coated with MoP was used. The surface of the negative electrode material coated with MoP was surface-treated in the same manner as in Example 1. The other configurations of the coin cell were made to be the same as in Example 1.

Charging characteristics of the coin cells manufactured in Examples 1 and 2 were measured. The coin cells were charged with CC/CV by varying the charging speed to 0.5 C, 1 C, 3C, and 6C, and discharged with CC at 1 C. The cycle was repeated 5 times at each discharging speed by setting the voltage range to 2.5 to 4.2 V.

Figure 4:
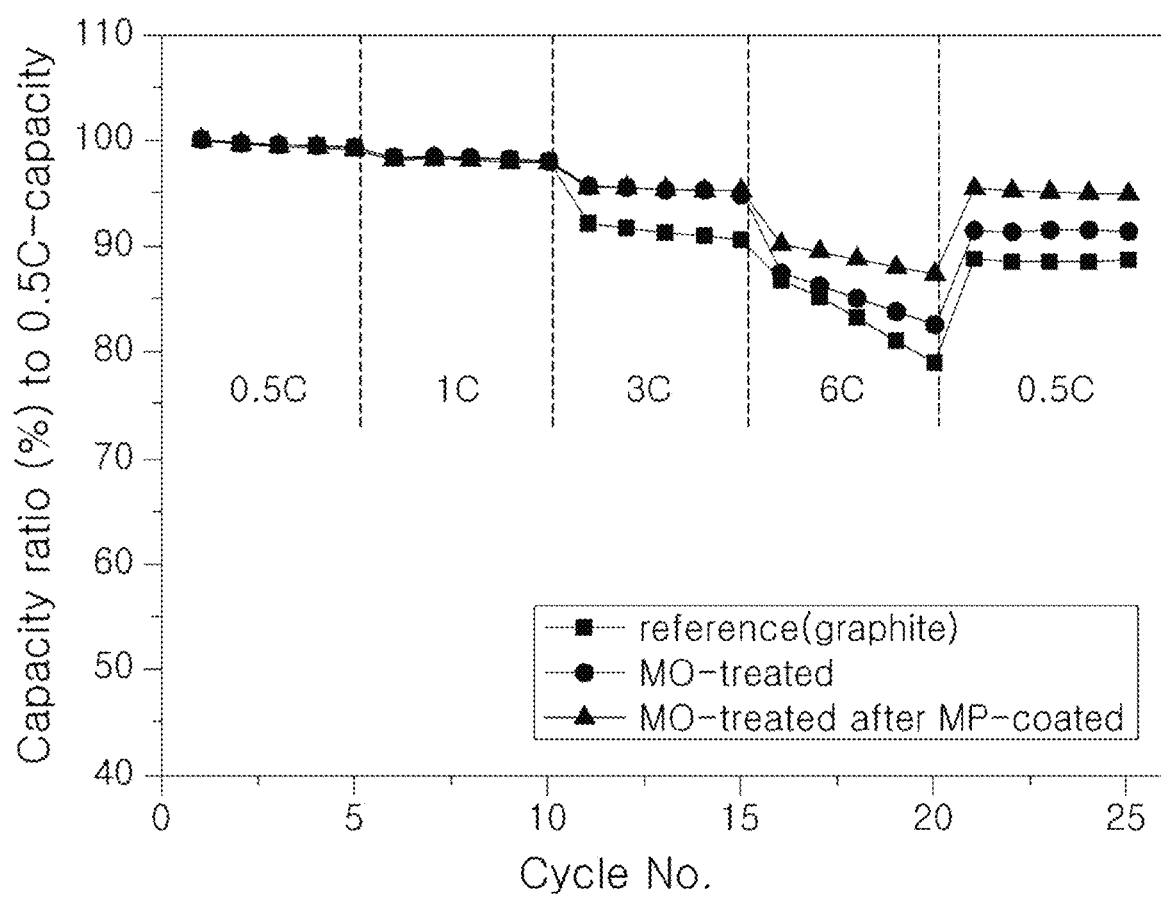
FIG. 4 is a graph illustrating the charging behavior according to the charging speed of a sample manufactured according to exemplary embodiments of the present invention.

FIG. 4 is a graph illustrating the charging behavior according to the charging speed in Examples 1 and 2.

Referring to FIG. 4, it can be seen that the coin cells in Example 1 (MO-treated) and Example 2 (MO-treated after MP-coated) exhibit higher capacities during high rate charging than the comparative example (reference).

Figure 5:
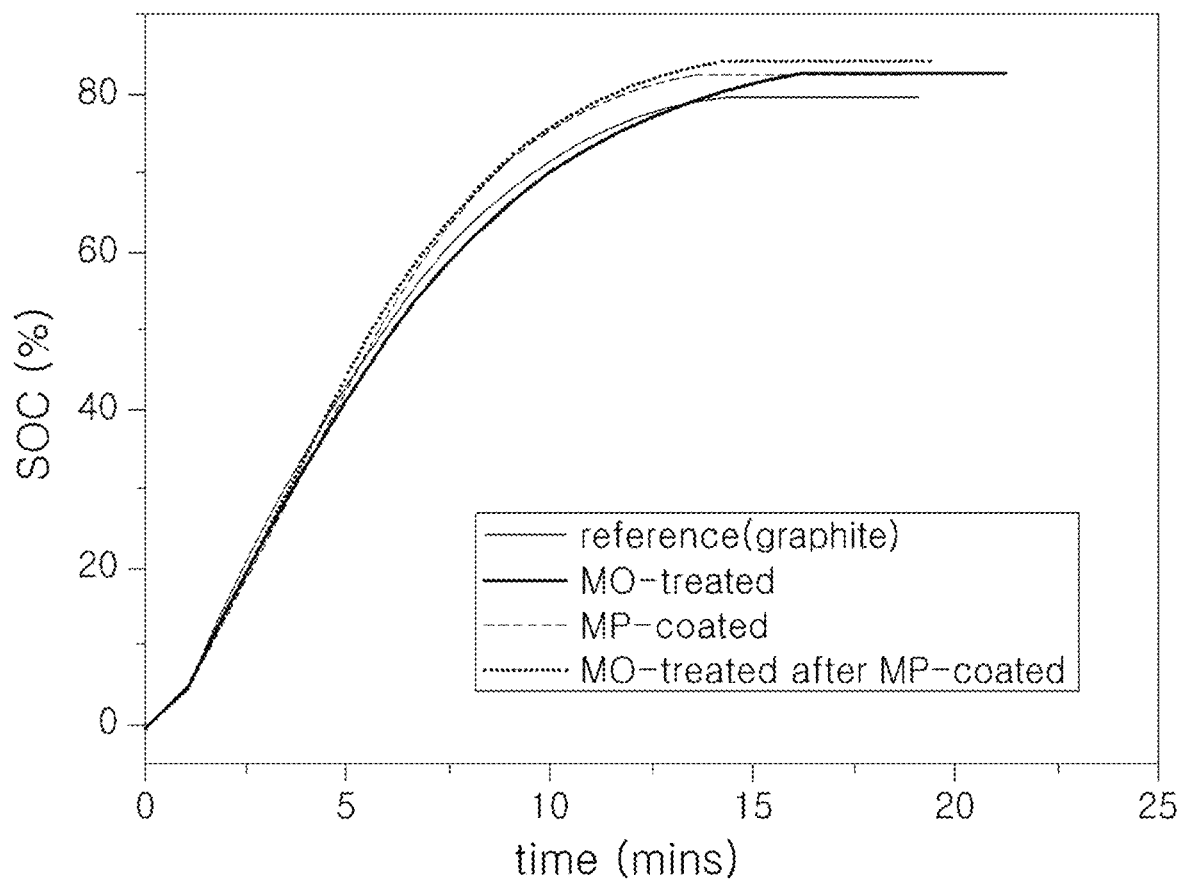
FIG. 5 is a graph illustrating a result of measuring a charging time of a sample manufactured according to exemplary embodiments of the present invention.

FIG. 5 is a graph illustrating the results of measuring the charging time in Examples 1 and 2, and the following Table 1 is a table summarizing and showing the SOC 80% arrival time for each sample.

TABLE 1

| Classification | SOC 80% arrival time |
|---|---|
| Reference | X (SOC 79% arrived - 19 minutes required) |
| MO-treated | 14 minutes |
| MP-coated | 11.7 minutes |
| MO-treated after MP-coated | 11.2 minutes |

Figure 6:
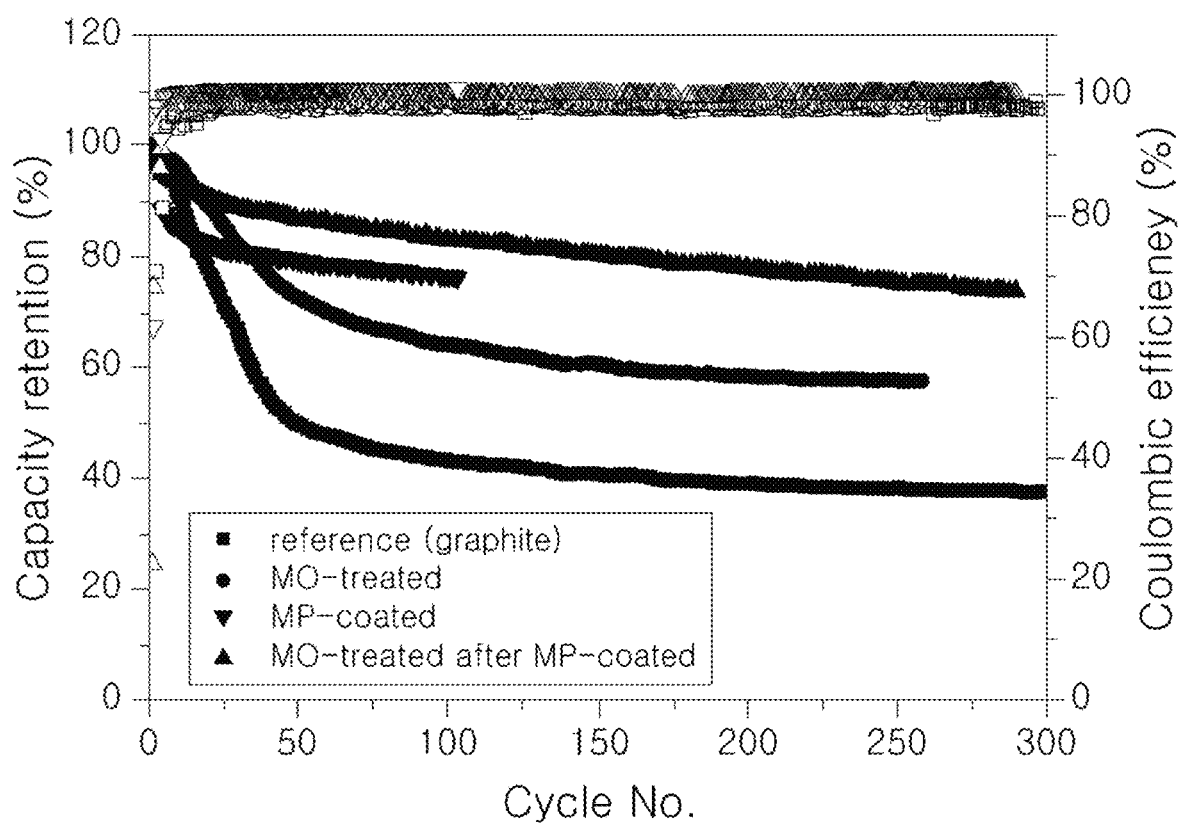
FIG. 6 is a graph illustrating cycle lifetime characteristics of the sample manufactured according to exemplary embodiments of the present invention.

Referring to FIG. 5 and Table 1, it can be confirmed that assuming that the total charge amount is 100%, when the arrival time to reach the charge rate of 80% is measured at a 6 C rate, the sample subjected to surface oxide treatment (MO-treated) has an effect of shortening the charging time compared to the comparative example (reference). Meanwhile, it is shown that the sample subjected to surface oxidation treatment after treatment with MoP (MO-treated after MP-coated) also has an effect of shortening the charging time compared to the sample subjected to only treatment with MoP (MP-coated). FIG. 6 is a graph illustrating cycle lifetime characteristics in Examples 1 and 2. Charging/discharging conditions for measuring the cycle lifetime were set as follows: charge: 6 CC/CV to 1/10 C, discharge: 1 C/CC voltage range: 2.5 to 4.2 V.

Referring to FIG. 6, it can be confirmed that the cycle lifetime of the electrode is improved when the metal oxide surface treatment (MO-treated, MO-treated after MP-coated) is performed.

Example 3

A positive electrode and a negative electrode were manufactured in the same manner as in Example 1, but after the surface of the negative electrode material was surface-treated with alumina, zinc oxide (ZnO), and copper oxide (CuO), a 2032 coin cell was manufactured in a mixture containing EC/EMC/DEC at a volume ratio of 3:5:2 using a 1 M $LiPF_6$ electrolyte solution, and charging and discharging characteristics were measured. The test conditions were set as follows: 1.7 C CC/CV to 1/10 C, Discharge: 1 C/CC, and Potential range: 2.5 to 4.2V. However, in this case, the loading level (based on 4.0 $mAh/cm^2$) was set to be higher than that in Example 1, and Table 2 shows the loading level and charging and discharging capacity characteristics of each electrode in the present Example.

Figure 7:
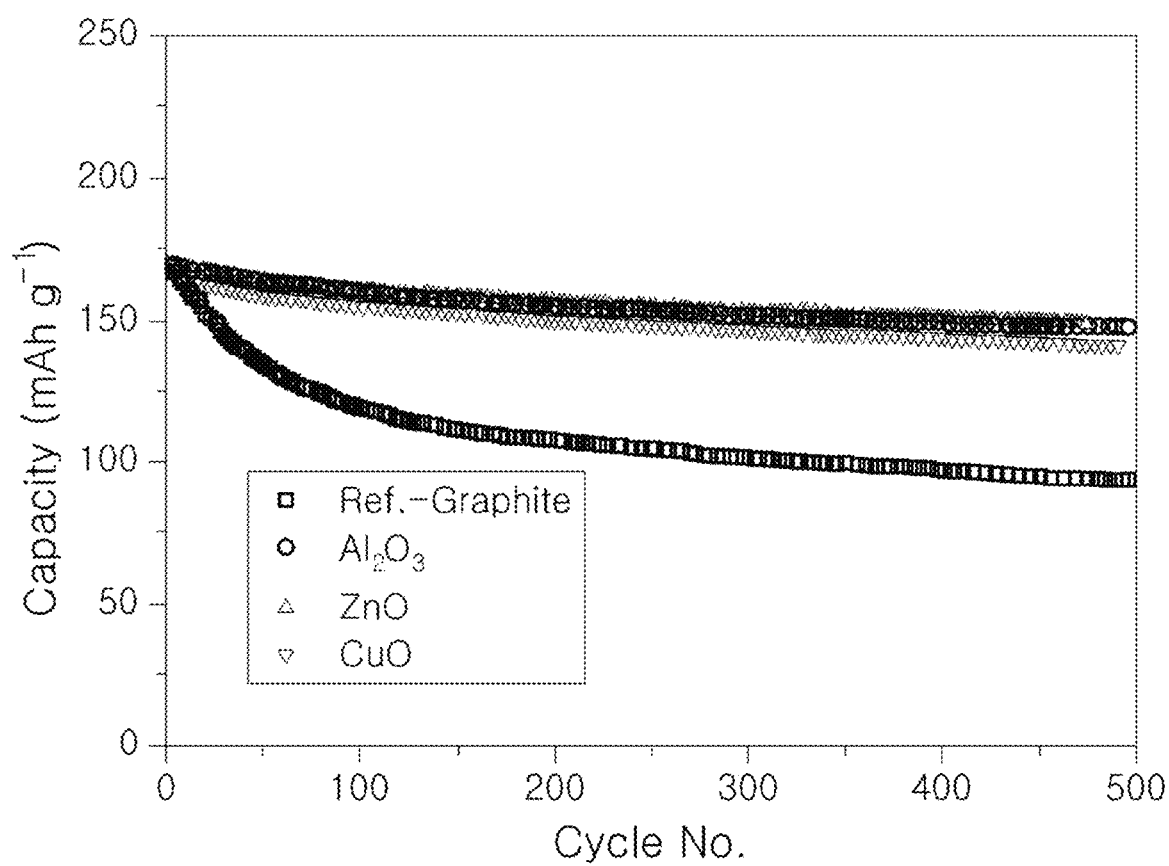
FIG. 7 is a graph illustrating cycle characteristics of each cell manufactured according to exemplary embodiments of the present invention.

FIG. 7 is a graph illustrating cycle characteristics of each manufactured cell. Referring to FIG. 7, it can be seen that even when the loading level is increased, characteristics of the surface-treated samples are improved as compared to the Ref sample. Further, it can be seen that even in the case of surface treatment with zinc oxide (ZnO) and copper oxide (CuO) in addition to alumina, a similar effect can be obtained.

Example 4

A cell was manufactured in the same manner as in Example 1, except that the loading level was based on 2.0 $mAh/cm^2$. The manufactured cell was subjected to 500 cycles of a charging and discharging test. For comparison, the Ref. cell in Example 2 was also tested under the same conditions.

Figure 8:
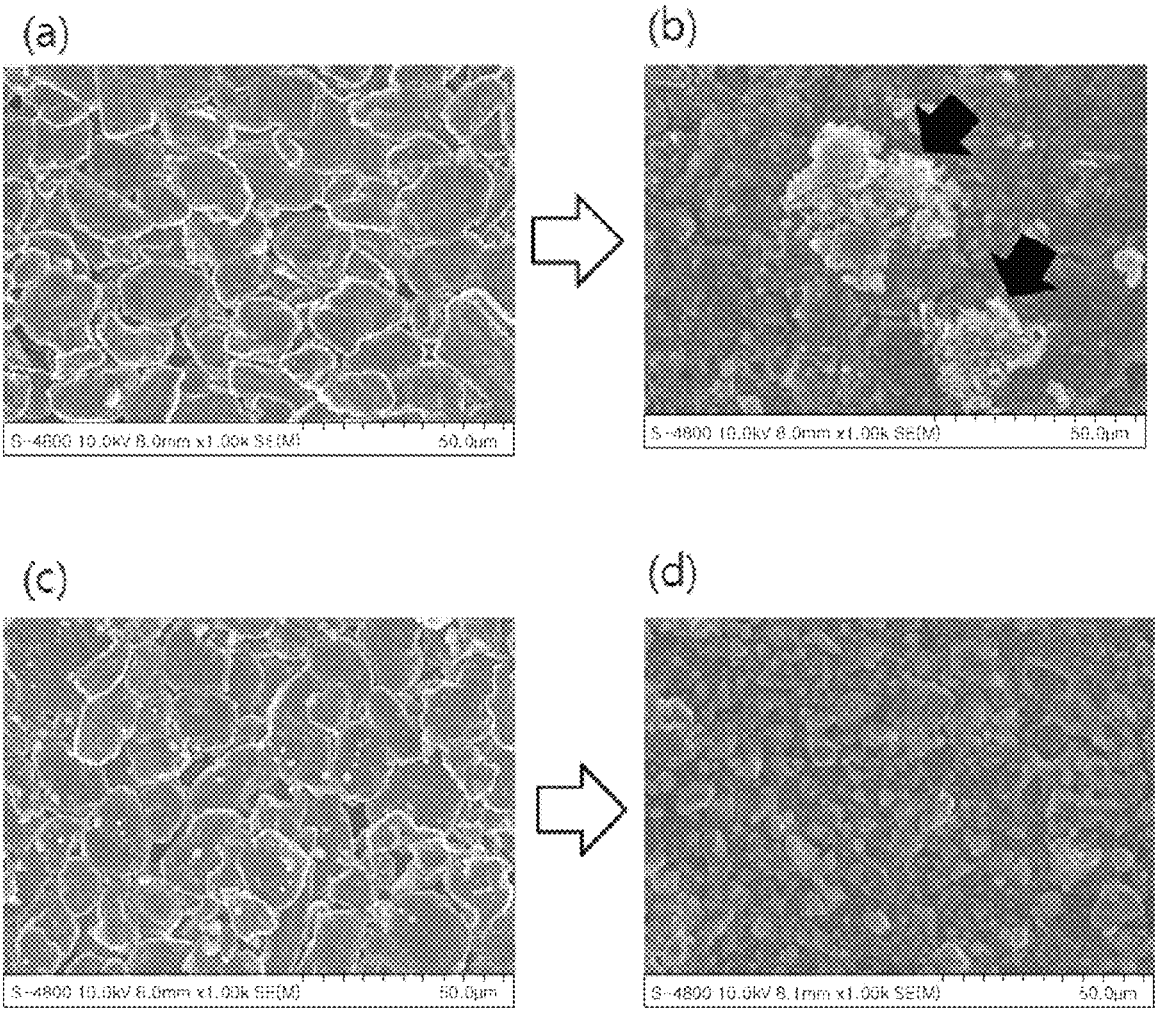
FIG. 8 is a series of photographs observing the surface of the negative electrode before and after a cycle test of the cells manufactured according to exemplary embodiments of the present invention.

FIG. 8 is a series of photographs observing the surface of the negative electrode of the cell before and after the cycle test.

FIG. 8(A) is a photograph before the test of the Ref. cell, FIG. 8(B) is a photograph after the test of the Ref. cell, FIG. 8(C) is a photograph before the test of the cell in the present Example, and FIG. 8(D) is a photograph after the test of the cell in the present Example.

From the above photographs, it can be seen that while the Ref. cell was subjected to the cycle test, precipitation of dendrite lithium occurred, but this phenomenon was not observed in the negative electrode of the cell manufactured in the present Example.

Figure 9:
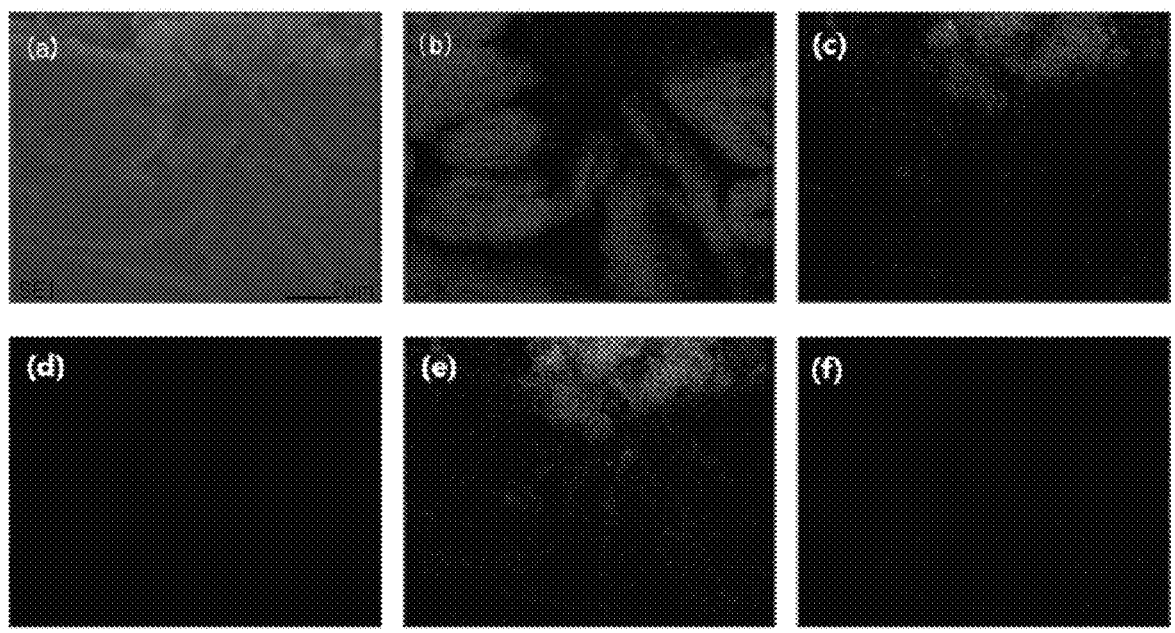

Meanwhile, FIG. 9 is a series of electron microscope photographs capturing the cross-section of the cell in the present Example after he test. FIG. 9(A) is an electron microscope photograph capturing the cross-section, and FIGS. 9(B) to 9(F) are photographs illustrating the result of EDS analysis of the region in the photograph in FIG. 9(A). Referring to FIGS. 9(A), (C), and (E), it can be seen that $Al_2O_3$ penetrates downward between the negative electrode material particles or in the vicinity of the neck, and that the penetration depth is approximately 10 μm from the surface of the negative electrode material.

Example 5

A cell was manufactured based on a loading level of 2.0 $mAh/cm^2$. In this case, the cell was manufactured by varying the concentration of alumina for surface treatment of the negative electrode material to treat the surface of the nega-

TABLE 2

| | Classification | L/L (mg/cm$^2$) | Density (g/cc) | Charge (mAh/g) | Discharge (mAh/g) | ICE (%) |
|---|---|---|---|---|---|---|
| Ref | Negative electrode | 14.1 | 1.68 | 205 | 178 | 86.8 |
| | Positive electrode | 24.2 | 2.93 | | | |
| $Al_2O_3$ | Negative electrode | 14.2 | 1.66 | 207 | 180 | 86.9 |
| | Positive electrode | 24.3 | 2.87 | | | |
| ZnO | Negative electrode | 14.1 | 1.63 | 208 | 181 | 87.0 |
| | 2: Positive electrode | 24.1 | 2.89 | | | |
| CuO | Negative electrode | 14.3 | 1.61 | 204 | 177 | 86.7 |
| | Positive electrode | 24.1 | 2.91 | | | | tive electrode. The other manufacturing conditions were made to be same as those in Example 1. The charging and discharging process was set as follows: Charge: 6 C CC/CV to 1/10 C, Discharge: 1 C/CC, and Potential range: 2.5 to 4.2 V.

Table 3 shows the results of measuring the residual capacity ratio at the 50th cycle.

TABLE 3

| Classification | | Residual capacity ratio (%) |
|---|---|---|
| | Ref. | 83.7 |
| $Al_2O_3$ | 2 wt % | 90.1 |
| | 4 wt % | 93.0 |
| | 6 wt % | 92.0 |
| | 8 wt % | 89.2 |

While preferred embodiments of the present invention have been described in detail hereinabove, it is to be well understood that the scope of the present invention is not limited thereto, and various modifications and improvements made by those skilled in the art using basic concepts of the present invention, which are defined in the following claims also fall within the scope of the present invention.

INDUSTRIAL APPLICABILITY

The present invention can be applied to a lithium secondary battery.

The invention claimed is:

1. A negative electrode for a lithium secondary battery, comprising:
a current collector;
a negative electrode material layer which is formed on the current collector and comprises negative electrode active material particles, conductive material particles, and a binder; and
a surface layer which is formed on the surface of the negative electrode material layer, is formed of insulating particles that are inert with respect to lithium, and partially shields the negative electrode material layer,
wherein an area occupied by the surface layer in the surface area of the negative electrode material layer is less than 10%, and
wherein the insulating particles of the surface layer are concentrated between the negative electrode active material particles.

2. The negative electrode of claim 1, wherein the surface layer comprises at least one selected from the group consisting of an insulating metal oxide, an insulating metal nitride, and an insulating metal oxynitride.

3. The negative electrode of claim 2, wherein the surface layer comprises at least one oxide selected from the group consisting of $Al_2O_3$, ZnO, CuO, BeO, $Be_2O$, $Be_2O_3$, $Be_6O$, $Na_2O$, MgO, $P_2O_5$, $K_2O$, CaO, MoO, $MoO_2$, $MoO_3$, NiO, $NiO_2$, CoO, $CoO_3$, $CoO_2$, $Cr_2O_3$, $Cr_3O_4$, NbO, $NbO_2$, $Nb_2O_5$, and $ZrO_2$.

4. The negative electrode of claim 1, wherein the surface layer is concentrated in the vicinity of a neck formed by the contact of the negative electrode active material particles, or at the edges of the negative electrode active material particles.

5. The negative electrode of claim 1, wherein the surface layer penetrates from the surface of the negative electrode material to the negative electrode material, and a penetration depth is 10 micrometers or less.

6. A method for manufacturing a negative electrode for a lithium secondary battery, the method comprising:
applying a negative electrode material composed of a negative electrode active material, a conductive material, and a binder onto a current collector; and
surface-treating the surface of the negative electrode material with insulating particles that are inert with respect to lithium,
wherein the surface-treating comprises:
preparing a coating solution by dispersing insulating particles in a solvent; applying the coating solution onto the negative electrode material; and
forming a surface layer by drying the applied coating solution,
wherein the solvent is glycerol, and a concentration of the insulating particles of the coating solution is 2 to 8 wt %.

7. The method of claim 6, wherein the drying is performed at 100 to 150° C.

8. The method of claim 6, wherein a penetration depth of the surface layer is 10 micrometers or less.

* * * * *